United States Patent [19]

Coward

[11] 4,139,464
[45] Feb. 13, 1979

[54] APPARATUS FOR AND METHOD OF CLARIFYING SUMP CONTENT

[75] Inventor: Michael Coward, Perrysburg, Ohio

[73] Assignee: Master Chemical Corporation, Perrysburg, Ohio

[21] Appl. No.: 818,319

[22] Filed: Jul. 22, 1977

[51] Int. Cl.$^2$ .................. B01D 37/00; B01D 29/00
[52] U.S. Cl. .................................... 210/74; 184/6.24; 210/168; 210/197
[58] Field of Search ............... 210/65, 74, 168, 194, 210/197, 416, 121; 184/6, 6.24

[56] References Cited

U.S. PATENT DOCUMENTS

| | | | |
|---|---|---|---|
| 1,359,453 | 11/1920 | Watson | 184/6.24 X |
| 1,883,594 | 10/1932 | Cross | 210/65 |
| 3,368,682 | 2/1968 | Boots | 210/121 |
| 3,489,245 | 1/1970 | Broadwell | 210/168 X |
| 3,679,053 | 7/1972 | Koulovatos et al. | 210/197 X |

Primary Examiner—William A. Cuchlinski, Jr.

[57] ABSTRACT

An apparatus for clarifying especially a select portion of the slurry content of a material reducing machine sump, the apparatus having a chamber providing a space into which such select portion of the sump slurry content may flow into engagement with a filter, the liquid component thereof passing through the same and back to the sump, individual and opposite acting pneumatic and hydraulic pressure producing means for inducing the mentioned flow into the chamber and engagement with and through the filter and return to the sump.

A method for clarifying a select portion of the slurry content in service of a material reducing machine sump in which a confined space exterior of the sump is subjected to a negative pneumatic pressure transmitted to the sump from such space through a conduit positioned that the free end thereof is in a selected slurry containing zone in the sump, thus to flow the slurry into the confined space and into engagement with a filter therein contained; applying a negative hydraulic pressure to the filter to draw the liquid component of the slurry through the filter with a greater pull than the pull exerted pneumatically within the chamber and flowing the filter passed component of the slurry back to the sump.

4 Claims, 5 Drawing Figures

APPARATUS FOR AND METHOD OF CLARIFYING SUMP CONTENT

BACKGROUND OF THE INVENTIONS

1. Field of the Inventions

Coolant slurry clarification apparatus and methods of a portable nature for service of a material reducing machine sump, such as the sumps of metal grinding or cutting machines, wherein coolant is delivered to the machine working site and gathered, along with the detritus of metal reducing work, and conveyed to the sump for subsequent recirculation to the work site, after the heat absorbed by the coolant has dissipated in the sump and the detritus in suspension in the coolant has settled into the sump lower regions.

2. Description of Prior Art

Portable clarifying apparatus and methods are not new in the art. The earlier prior art structures and methods contemplated the provision of a portable chambered body that could be trundled to a serving position, adjacent a machine, the sump of which was to be cleaned. Means was provided by which the pneumatic pressure within the body chamber could be varied, under the operator's control, from positive to negative. This allowed, when negative pressure prevailed, flow of the sump content from the sump through a conduit connected to the chamber and inserted in the sump to the space within the chamber. As the slurry entered the chamber, it engaged and was caused to pass through a filter, separating the detritus component from the liquid component. After the entire content of the sump had been thus withdrawn, the operator disconnected the intake conduit, either physically or by valves, and connected a return conduit, either physically or by valves. Then, by subjecting the chamber space to positive pneumatic pressure, the clarified liquid component was extruded from the chamber and thus returned to the sump. The detritus component was contained in and captured by the filter which was later lifted from the chamber for dumping and disposal.

Subsequent developments in the prior art resulted in moving the filter from the chamber inlet to the chamber outlet. This greatly enlarged the capacity of the apparatus to continue operating, notwithstanding large deposits of filter called detritus. In each of the above described instances, however, it was necessary to shut the machine down whose sump was being clarified. Those skilled in the art will immediately recognize the serious increase in operating costs in consequence of shutting down a production machine.

In more recent efforts to avoid the necessity to shut the served machine down, during the period of sump cleaning, certain workers in the prior art, of whom BAXTER of U.S. Pat. No. 3,121,691 appears typical, sought to clean sump slurry continuously. This was accomplished by means of a battery of filters, triggered to come into culling position from standby exterior cleaning stations and to return to such stations, as each filter becomes choked with detritus. Such apparatus and methods have proven expensive and troublesome in continued maintenance.

SUMMARY OF INVENTIONS

The inventions disclosed herein contemplate a solution of the problem of the earlier need to shut that machine down, while clarification is being accomplished. In addition, the inventions contemplate the provision of apparatus and practice of a method by a portable structure of a viable dimension, with respect to plant floor space, the use and practice of which, a sump may be clarified notwithstanding the sump having an original content considerably greater than the capacity of clarification apparatus. In this sense, the apparatus and method has many of the advantages of continuous cleaning systems.

More particularly, the inventions are concerned with and are purposed to remedy, simplify and by an easily operated and maintained apparatus and method, the need to shut productive machinery down and out of service, while sump cleaning is accomplished and the need to provide large capacity or expensive equipment to clean large sumps such as those serving a battery of material reducing machines.

DESCRIPTION OF PREFERRED EMBODIMENT

Figure 1:
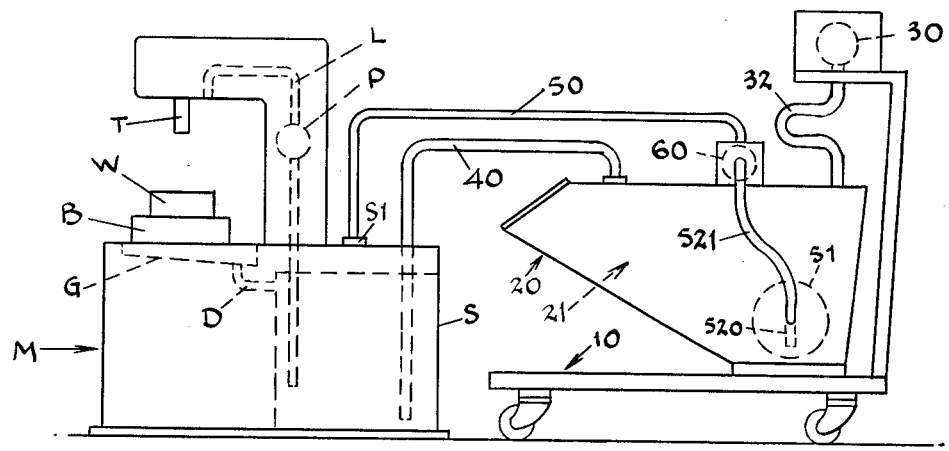
FIG. 1 illustrates, diagramatically, a material working machine, such as a metal drilling machine, having a coolant sump being serviced by a clarifying apparatus and in accordance with a clarifying method embodying the features of my invention.

As illustrated in the accompanying drawings, an apparatus, embodying the features of my invention, is preferably mounted on a mobile frame 10 hereinafter to be described. The frame 10 supports a chambered body 20. The body 20, with its chamber serves that and other functions, as will be later explained. Pressure generating means, broadly indicated at 30, generates pneumatic pressures and together with that, indicated at 60, which generates hydraulic pressures in a manner as will be later described, serves to motivate the clarification flow. The pressure generating means 30 and 60 are operatively connected and connectible with the chambered body 20 and a sump S to be cleaned, by individual conduit means 40 and 50, the particulars of which will hereinafter appear. The pressure generating means 30 and 60 are responsive to electrical circuits 70 as will be made apparent.

Figure 2:
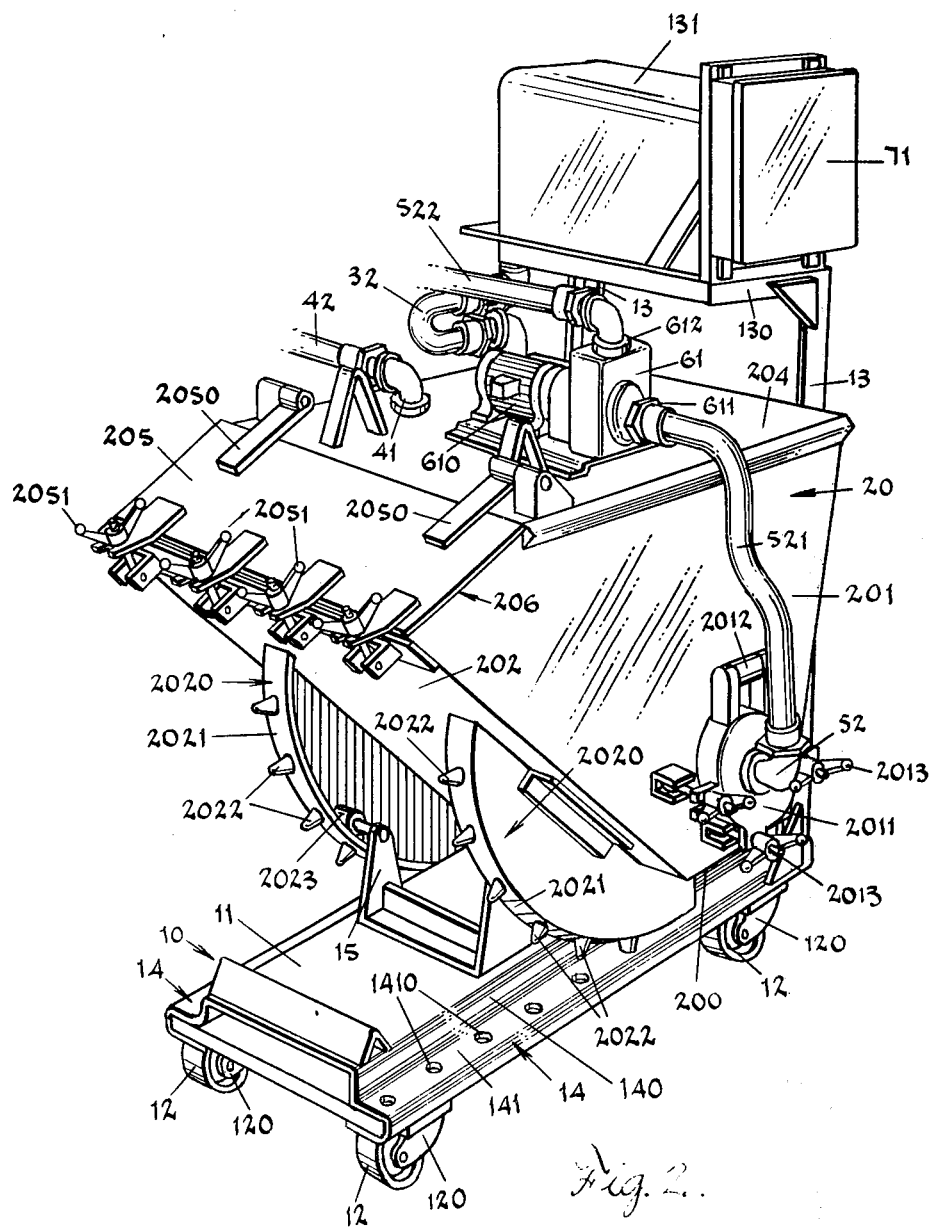
FIG. 2 illustrates a perspective view of a clarifying apparatus, embodying the features of my invention, diagrammatically indicated in FIG. 1, and one of the means by which a clarifying method, incorporating the features of my invention, may be accomplished.
Figure 3:
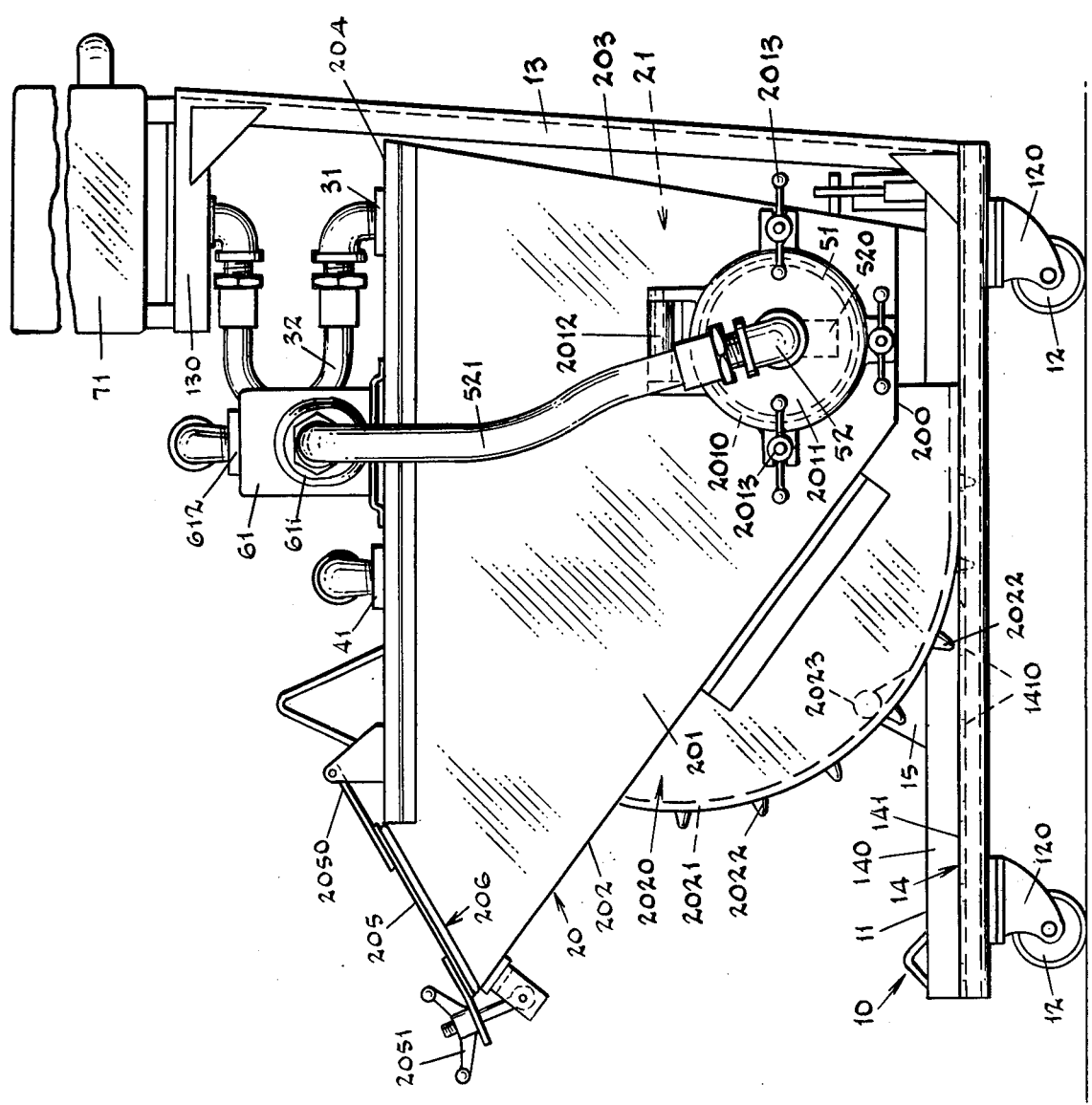
FIG. 3 illustrates a view of a side elevation of the clarifying apparatus shown in FIG. 2.
Figure 4:
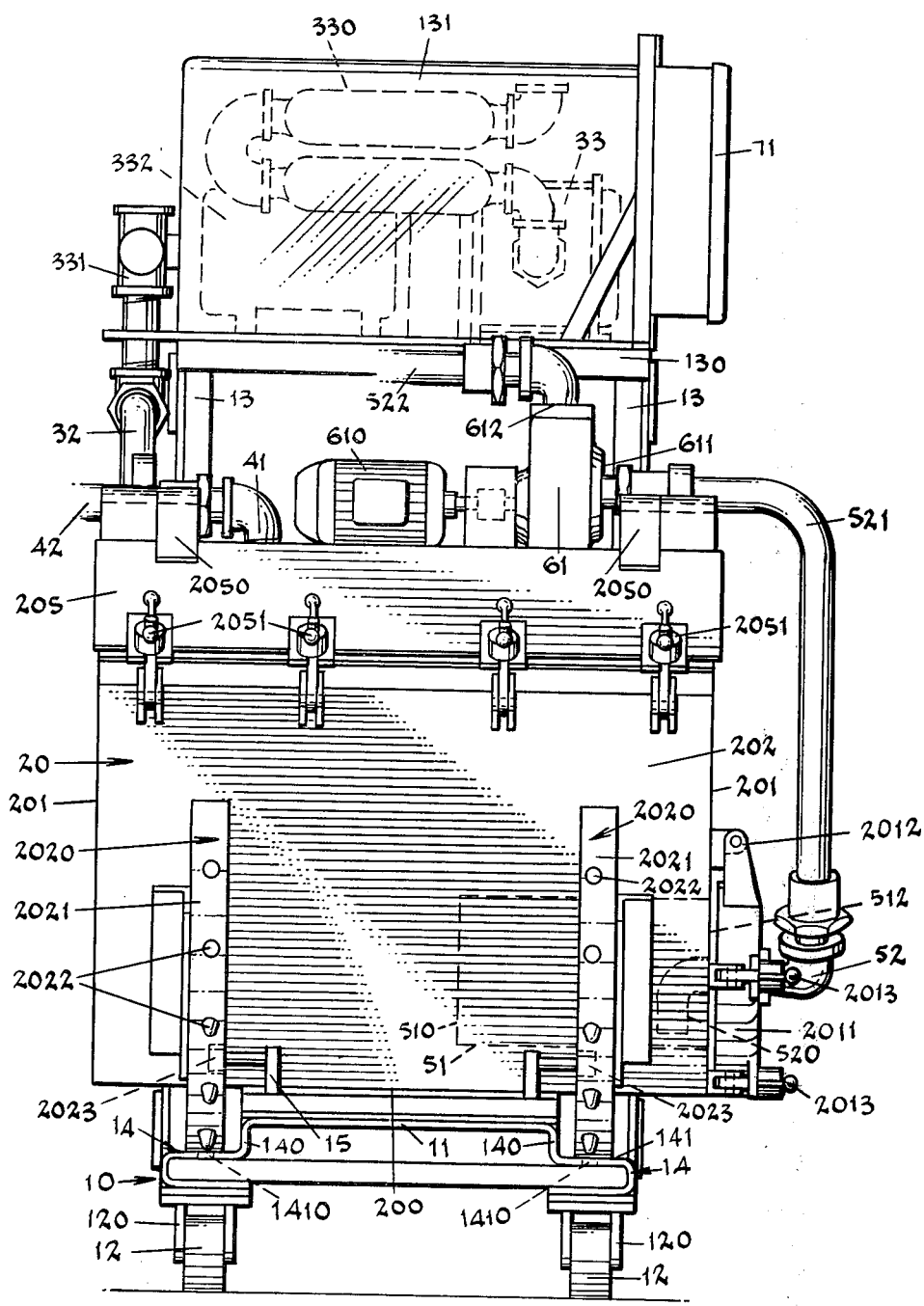
FIG. 4 illustrates a front end view, in elevation, of the clarifying apparatus shown in FIGS. 2 and 3.

The frame 10, the details of which are shown best in FIGS. 2, 3 and 4 of the accompanying drawings, comprises a rectangular platform 11 supported for movement by small wheels or casters 12. The casters 12 are suitably affixed by journals 120, well known in the art, to the underside of the platform 11. This allows the platform to be drawn to and from a serving relation adjacent the sump S of a material reducing machine, such as a metal drilling machine M, diagramatically shown in FIG. 1 of the drawings.

The frame 10 also has a pair of tracks 14, each extending parallel to the other along the long side and outer perimeter of the platform 11. Each track 14 may be integral with the platform 11, being defined therefrom by a shoulder 140 and a horizontally extending bearing or land portion 141. The land portion 141 preferably has a plurality of aligned recesses or openings 1410, whose purpose will be explained. The aligned recesses or openings 1410 in each land portion 141 of each track 14 are in sequence along the track 14 and thus parallel to each other and to the major longitudinal axis of the platform 11.

The body 20 may be formed from suitable edge welded sheet metal panels arranged to provide a horizontally extending bottom 200, a pair of similar vertically extending sides 201, a pair of opposite inclinedly extending ends 202 and 203 and a top 204. The mentioned panels, together with a cover 205, define a chamber 21. The body 20 is movably supported on the frame 10 for reasons that will be explained.

To provide for such movement, the inclined end panel 202 of the body 20 has, as is best shown in FIGS. 2 and 3 of the drawings, a pair of accurately shaped rocker bearings 2020. The bearings 2020 may be suitably affixed, as by welding, to the exterior surface of the end panel 202 to extend parallel to each other along lines that are spaced distances substantially equal to the spacing of the tracks 14 on the frame 10. Each bearing 2020 has a rim 2021 from which a plurality of pin teeth 2022 project, substantially, radially. Thus when the body 20 is placed upon the frame 10, the bearing rims 2021 engage the land portion 141 of the track 14 of the frame. In order to insure that the rims 2021 continue to ride the track land portions 141 as when the body 20 is to be moved relative to the frame by rocking the body relative thereto, the pin teeth 2022 on the bearing rims successively mesh with the openings 1410 in the track land portions 141. Such movement of the body relative to the frame 10 allows the body 20 to tip toward the upper edge of end panel 202 thereof for reasons that will be apparent.

If desired, a pair of retainer rolls 2023, journaled in a bracket 15 suitably affixed to the platform 11 may be provided. The bracket 15 supports the rolls 2023 in rolling engagement with the inner surfaces of rims 2021, as shown in FIG. 2. The rolls 2023 cooperate with the teeth 2022 and openings 1410 to retain the bearings 2020 on and in engagement with the track land portions 141.

As is best shown in FIGS. 2 and 3 of the drawings, the upper edge of the end panel 202 is spaced from an adjacent edge of the top panel 204, thus to provide a normally closed opening 206. The opening 206 is normally closed by the mentioned cover 205 which may be suitably hinged, as at 2050, to the top panel 204. Locking means, such as clamps 2051, mounted on the end panel 202 and cover 205 serve to retain the cover in a closed and sealing relation over the opening 206, thus to define a confined space or chamber 21 within the body 20.

Access to the chamber 21, when the cover 205 is thus closed, may be accomplished through a fitting component 31 of the pneumatic pressure generating means 30. The fitting 31 preferably is mounted in and extends through the top panel 204, being connected, as by a flexible hose conduit 32, to the intake of a positive displacement vacuum pump 33. The pump 33 preferably is mounted on the shelf 130 within a housing 131 there provided. It may be of the variety exemplified in and known to the trade as a SUTORBILT Model 4 MVB pump, with suitable exhaust to atmosphere through manifolding 330. Vacuum relief valving 331, well known in the art, is provided and set to vent when the negative pressure produced by the pump in the intake exceeds a pull of twelve (12) inches Hg to momentarily open and relieve the same. The pump 33 may be driven by an electric motor 332, the control of which is afforded by the circuitry 70.

When the motor 332 is actuated, the pump 33 generates a negative pneumatic pressure which condition characterizes the pneumatics within the chamber 21 to accomplish purposes now to be explained.

Further access to the chamber 21 may be accomplished through a fitting component 41 of the intake conduit means 40. The fitting 41, like the fitting 31, is preferably mounted on and extends through the top panel 204 at a point spaced and well removed from the disposition of the fitting 31. The fitting 41 is adapted to be connected, externally of the chamber 21, to a flexible hose conduit 42 having a nozzle tube end 43. The nozzle end 43 may be grasped and manipulated by the apparatus operator into the sump S as and to a position therein such as is diagramatically indicated in FIG. 5 of the drawings.

It will be apparent to those skilled in the art that the negative pressure condition generated in the chamber 21 by the pump 33 and communicated through the fitting 41, conduit 42 and its tube end 43 will cause portions of the sump content proximate the tube end 43 to be drawn into the chamber 21. In doing so, the quantity of sump content will decrease, as from an optimum content indicated diagramatically by the broken surface line OC in FIG. 5 of the drawings, to some lesser content. It is within the contemplation of my inventions to clarify such withdrawn portion of the sump content and to return the clarified liquid component thereof to the sump, during the course of withdrawal and in such time frame with reference thereto as to maintain sump content greater than the MC level or a minimum operating content requirement of the machine served by the sump.

Optimum sump content in a typical operating situation, when clarification thereof is desirable and indicated by the requirements efficient operation could occupy a displacement of the order of one-thousand (1000) gallons. I indicate the level of the sump content when at such displacement by the line OC in FIG. 5. At this stage, the sump content consists of a pool of its liquid component Q from which the detritus or metal fines of machine working are setting or have settled and a deposit or cake of its detritus component C.

At this stage, the liquid component Q will constitute seventy five to eighty (75%–80%) percent of the sump content and the detritus C will constitute the remainder, volumetrically speaking. The mix of liquid and detritus components, as the sump portion is withdrawn from the sump and delivered into the chamber 21, will have the characteristics of a liquid and solids slurry. Thus, a portion of the sump content enters the chamber 21 through the fitting 41, it will be directed by the downwardly angling end panel 202 and will flow toward the bottom panel 200. In such flow, the withdrawn portion of the sump content engages a filter component 51 of the return conduit means 50 shown in FIGS. 1, 4 and 5 of the drawings.

The filter 51, preferably, comprises a metal cylinder having one closed end 510, a reticulated lateral wall 511 and open end 512. When the withdrawn portion of the sump content flows to the filter 51, the liquid component of such portion passes through the reticulated wall 511 of the filter cylinder wall 511 and in the chamber 21. The open other end 512 of the filter 51 registers with an opening 2010 in side panel 201. Closure means is provided for such opening 2010, preferably including a hatch 2011, shown best in FIGS. 3 and 4 of the drawings. The hatch 2011 may be hingedly mounted relative to the body 20, as indicated at 2012. Suitable clamps, such as those indicated 2013, may be provided and serve to removably lock and hold the hatch 2011 in closed and sealing relation to the side panel 201, the opening 2010 therein and the open end 512 of the filter 51.

A fitting 52 extends through the hatch 2011 and connects at one end thereof with a downwardly extending stand-pipe 520 within the filter cylinder 51. A conduit 521 connects the other end of the fitting 52 to and through the hydraulic pressure generating means 60, in a manner to be later described, with one end of a flexible hose conduit 522. The other end of the hose conduit 522 is connectible and connects with a fitting S1 on the sump.

Filtration and movement of the liquid component of the selected withdrawn portion of sump content back to the sump is a consequnce of applying a negative hydraulic pressure exerting a pull, in the described liquid component return passageway, significantly (i.e. 40% to 60%) greater than the pneumatic pull exerted in the chamber 21 by the pump 33. Preferably, in the particular apparatus being herein described the pull exerted by the hydraulic pressure applied is of the order of between fifty-eight and fifty-nine percent greater than the pull exerted by the pump 33. In order to exert such hydraulic pressure, my invention contemplates the incorporation of the hydraulic pressure generating means 60, intermediate the ends of the liquid component return passageway just described.

The principal element in the hydraulic pressure generating means is a pump 61. The pump 61, well known in the art, is a self-priming positive displacement liquid pump. The pump 61 is motor driven, as by an electric motor 610. Conduit 521, as heretofore described, connects with the intake 611 of pump 61 and the flexible hose conduit 522 connects with the exhaust 612 of the pump. Suitable hydraulic pressure sensitive switching, well known to the art, governs the motor 610 to cause the pump 61, when operating, to generate a constant negative hydraulic pressure at the pump intake. The order of the negative hydraulic pressure thus generated is predetermined to bear the heretofore described ratio relative to the negative pneumatic pressure generated by the pump 33.

In addition to the governing function mentioned, the motors 332 and 610 that drive the pneumatic and hydraulic pressure generating pumps 33 and 61 are responsive and controlled by circuitry 70.

Figure 5:
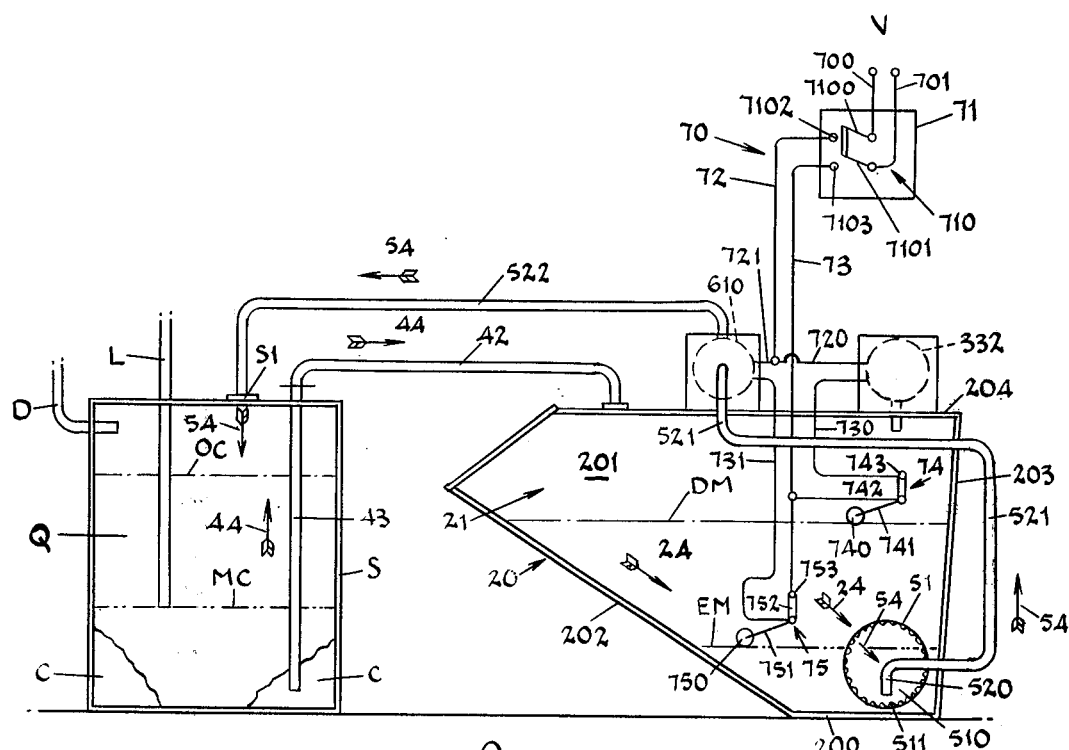
FIG. 5 illustrates, diagramatically and similarly to FIG. 1 the pneumatic, hydraulic and electric ducts and circuits by which the apparatus shown on FIGS. 2, 3 and 4 are controlled and operated with respect to the sump shown in FIG. 1.

Reference to FIG. 5 of the accompanying drawings will prove helpful in the description of such circuitry. Energizing current enters the circuitry from source V through lines 700 and 701 connecting with a suitable switching, breaker, and signal containing console 71. The console 71 may be mounted on the frame shelf 130, within easy reach of the operator. Among the switches therein contained is a main starting switch 710. The main starting switch 710 may be manually operable, having movable contracts 7100 and 7010 connected to and in circuit, with main lines 700 and 701 from the source VI. Switch 710 has fixed contacts 7102 and 7103.

Preferably, the motor 332 that drives the pneumatic negative pressure generating pump 33 and the motor 610 that drives the hydraulic negative pressure generating pump 61 are connected to the contacts 7102 and 7103. Thus, distributor line 72 is connected to contact 7102 of switch 710 and to branch lines 720 and 721. Branch line 720 leads to one side of the motor 332 and branch line 721 to one side of motor 610.

Return distributor line 73 is connected to contact 7102 of the starting switch 710 and by branch return lines 730 and 731 to each of the pump driving motors. Specifically, branch return line 730 is connected to the other side of motor 332 and branch return line 731 to the other side of motor 610. Thus, when the starting switch 710 is manually activated by the operator to close, both motors 332 and 610 will receive current from the source and both pumps 33 and 61 will be put into operation.

As heretofore mentioned, suitable stop control switches 74 and 75 are provided in the motor circuits. In this connection, I provide the normally-closed, float-operated switch 74 in the branch return line 730 of the motor 332. Switch 74 has a float 740 on the end of a pivotally supported switch operating arm 741. The arm 741, in its pivotal movement in response to movement of the float 730, operates to move a movable switch contact 742 from its normal position of engagement with fixed switch contact 743. The contacts 742 and 743 are in the line 730 so that on movement of one away from the other, the described circuit to the motor 332 will be opened, allowing the motor and its driven pump 33 to stop. The float 740 is so positioned in the chamber 21 as to be moved, if and when material content of the chamber 21 exceeds a desired maximum, such as that indicated by broken line DM in FIG. 5 of the drawings. On discontinuance of operation of the motor 332 and pump 33 the further withdrawal of sump material into the chamber 21 will cease, until the chamber content is reduced to something equal or less than the desired maximum DM.

Similarly, I provide the normally-open, float-operated switch 75 in the branch return line 731 of the motor 610. Switch 75, like switch 74, has a float 750 on the end of a pivotally supported switch operating arm 751. The arm 751 in its pivotal movement responsive to movement of the float 750 operates to move a movable switch contact 752 in the return line 731 from its normal open position in said line to a position engaging the switch fixed contact 753. This action closes the line 731 enabling operation of the motor 610 and pump 61. The float 750 is positioned, like float 730, in the chamber 21 so as to be moved to close the switch 75 when the content of the chamber 21 exceeds an essential minimum, such as that indicated by the broken line EM in FIG. 5 of the drawings. Discontinuation of operation of the motor 610 and pump 61 occurs, however, when the material content of the chamber 21 decreases to less than this essential minimum EM. Provision to assure initial operation may be had by providing the chamber 21 with a primeing content to on an amount sufficient to constitute such essential minimum, activating the float 750 and closing the switch 75.

Operations of the apparatus, heretofore described, and the practice of the method taught by my invention becomes apparent, when the same is considered in conjunction with its practical purpose of service in industry. In FIGS. 1 and 5 of the accompanying drawings, I show such a relation to an apparatus in the machine tool industry. The boring machine M having the sump S is there shown. As is well known, work W on which the machine M is acting is placed on a bolster or bed-plate B and subjected to boring pressure by a cutting tool T. In order to cool the tool and the work and to carry away the particles of cutting from the site, coolant from the sump S is conducted by line L in response to the action of coolant pump P and discharged to flow over the tool and the work. The spent coolant and such particles of the detritus of cutting are gathered in a basin G, below the bed-plate B, and, by gravity, flow as a slurry through drain D back into the sump S. The capacity of sumps in the metal working industry vary, the modern tendency being toward larger and larger capacity sumps. Sumps of one-thousand gallon or more capacity are not unusual, particularly in systems in which a single sump is to serve a battery or constellation of material reducing machines.

When the spent coolant and the therein suspended or carried particles of machine material reduction enter the sump S, many of the particles settle out and becomes deposited in the lower regions of the sump, forming what the trade calls "cake". Such deposition is indicated at C in FIG. 5. The spent coolant dissipates the heat it had absorbed from the tool and work and blends with other coolant of the sump as a pool of liquid Q, preparatory to again being lifted through the coolant lines L by the pump P for application to the tool and work.

In the course of time, the cake content of the sump increases and reaches a condition at which it must be removed. Good practice indicates that the cake content of a sump significantly decreases efficiency and increases working and maintenance costs when, the cake in its displacement, exceeds twenty-five percent of the sump capacity.

At such time, clarification is indicated. The apparatus heretofore described is moved into position adjacent the sump. The starting switch 710 is actuated and the operator introduces the nozzle end 43 into the sump S, particularly into the lower region thereof in which the cake C has become deposited. This selected portion is sucked up, as a slurry of detritus and liquid, by the nozzle end 43 and conveyed along the conduit 42 to within the chamber 21. This flow, in this connection, is indicated by the arrow 44, in FIG. 5. Obviously, the flow into chamber 21 is in consequence of the negative pneumatic pressure being generated by the pump 33.

In the particular structure I have constructed embodying my invention the chamber 21 has a 400 gallon capacity and pull of the pump 33 is such, in reference to the conduit dimension and other factors that determine flow, as to produce an inflow of one-hundred gallons per minute. The inflowing slurry is discharged through the fitting 41 into the chamber to be directed by the inclined end wall 202 of the chamber 21 toward and as indicated by arrows 24 into engagement with the filter 51.

In response to the greater negative and hydraulic pressure exerted on the liquid component of the slurry by the pump 61, the liquid passes through the filter and enters the stand-pipe 520, and is conveyed by conduits 521 and 522 back to the sump S as indicated by arrows 54. My experience with an apparatus of the kind described requires that the dimensions on the stand-pipe 520, fitting 52 and return conduits 521 and 522 together with the capacity and pull of the pump 61 should be such as to produce a return flow at least equal, in gallonage, to the withdrawn gallonage from the sump S. Thus, in a sump of which the slurry to be clarified is a composite of three parts liquid and one part detritus, the pump 61 will operate, during the entire clarification period, no more than three-fourths of the time that the withdrawal pump 33 is operating during such period. Actually, the pump 61 operates in intervals during the operation of the pump 33, the total of which intervals equals something less than three-fourths of the total operating time of pump 33.

This interval operation of the pump 61, its duration and dwell, is a product operation of and controlled by switch 75, the structure and operation of which has been already described. When the pump 61 has scavenged the chamber 21 of such content as to bring the level of that remaining in the chamber 21 to below the essential minimum EM, the switch 75 opens breaking the circuit to the pump driving motor 610. When through the continuing action of pump 33, the content level in the chamber increases to above the EM line, the circuit to pump driving motor 610 is re-established and the return flow of clarified coolant resumed.

Upon completion of the pass of the sump content through and relative the chamber 21, the apparatus may be drawn from the working floor. The separated detritus may be discharged through the opening 206 by releasing the cover 205 and tilting the body 20 on its rocker bearings 2020. The apparatus is now in condition to receive a fresh prime and to enter into a further service relation. The apparatus and method which applicant here teaches thus brings to the art advantages of continuous sump clarification within the parameters of simplicity and low cost exemplified in the earlier structure and methods of clarification.

I claim:

1. In a clarifying apparatus, for service of a material working machine sump to which coolant liquid and material detritus of the machine working is delivered, having a body;

the body having a chamber;

the chamber having spaced inlet and outlet openings;

a detritus culling filter within the chamber, between and separating the openings;

a conduit in engagement with the body and in communication, at one of the conduit ends, with the chamber inlet and adapted, at the other of the conduit ends, for insertion into the sump and forming, with the body and the chamber thereof, a substantially closed pneumatic and hydraulic system between the sump inserted conduit end and the chamber outlet opening, the combination therewith of:

a pneumatic pump in engagement with the body and having the intake of the pneumatic pump in communication with the chamber and adapted, when actuated, to produce a negative pneumatic pressure of a predetermined, substantially constant pull within the chamber and through the conduit thereby to draw sump content portions through the conduit into the inlet opening side of the filter of the chamber;

a hydraulic pump in engagement with the body having the intake of the hydraulic pump in communication with the outlet opening of the chamber and adapted, when actuated for producing a hydraulic pressure of a predetermined, substantially constant and greater pull within the chamber than the pull generated within the chamber by the pneumatic pump thereby to draw the sump content within the chamber through the filter and outwardly through the chamber outlet notwithstanding the negative pneumatic pressure within the chamber generated by the pneumatic pump and;

a second conduit, of which one end is in engagement with the hydraulic pump and is connected to and communicates with the hydraulic pump discharge and with the sump, whereby, when both pumps are actuated, a clarified liquid component of the sump content drawn into the chamber from the sump is returned to the sump at a volume rate per unit of time approximately equal to the volume of the liquid component of the sump content withdrawn from the sump in that unit of time.

2. In a clarifying apparatus, as described in claim 1, wherein the hydraulic pump, when actuated, is adapted to produce hydraulic pressure of a pull between forty to sixty (40% to 60%) percent greater than the pull of the pneumatic pump, when actuated.

3. A method of clarifying content of a sump in service of a material reducing machine comprising the steps of applying a substantially constant, negative pneumatic pressure of a predetermined pull to a confined space exterior of the sump and along an enclosed passage connecting the confined space and sump to thereby draw sump content along the enclosed passage and into the confined space;

directing the drawn sump content to engage a filter in the confined space;

applying, during the time period in which the negative pneumatic pressure is applied, a substantially constant hydraulic pressure of a predetermined greater pull than the pull exerted by the negative pneumatic pressure to a second enclosed passage connecting the sump and the confined space at a point downstream of the filter; and directing the liquid component of the sump content drawn into the confined space along the second enclosed passage to the sump, whereby the liquid component of the sump content drawn into the confined space is drawn through the filter and returned in clarified condition to the sump at a volume rate per unit of time approximately equal to the volume of the liquid component of the sump content withdrawn from the sump in that unit of time.

4. A method of clarifying the content of a sump, as described in claim 3, in which the applied negative hydraulic pressure exerts a pull between forty to sixty (40% to 60%) percent greater than the pull exerted by the applied negative pneumatic pressure.

* * * * *